US 7,052,185 B2

(12) United States Patent
Rubino et al.

(10) Patent No.: US 7,052,185 B2
(45) Date of Patent: May 30, 2006

(54) FIBER OPTIC CABLE CONNECTOR WITH A PLURALITY OF ALIGNMENT FEATURES

(75) Inventors: Robert A. Rubino, Tolland, CT (US); Nabil E. Mishriky, Portland, CT (US); Daniel Caisse, Portland, CT (US); Peter Gumprecht, Southington, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/772,091

(22) Filed: Feb. 3, 2004

(65) Prior Publication Data

US 2004/0247251 A1    Dec. 9, 2004

Related U.S. Application Data

(63) Continuation-in-part of application No. 09/594,645, filed on Jun. 15, 2000, now Pat. No. 6,685,361.

(51) Int. Cl.
*G02B 6/38* (2006.01)

(52) U.S. Cl. .......................................... 385/58; 385/60
(58) Field of Classification Search ................ 385/58, 385/59, 55, 66, 69, 70, 71, 53, 60, 82–86, 385/77, 78; 439/752.5, 680, 610
See application file for complete search history.

(56) References Cited

U.S. PATENT DOCUMENTS

| | | | |
|---|---|---|---|
| 3,945,700 A | 3/1976 | Didier ........................ | 339/59 |
| 4,140,367 A | 2/1979 | Makuch et al. .......... | 350/96.22 |
| 4,225,214 A | 9/1980 | Hodge et al. ............ | 350/96.21 |
| 4,252,406 A | 2/1981 | Ryan, Jr. et al. ........ | 350/96.21 |
| 4,759,601 A | 7/1988 | Knutsen et al. ......... | 350/96.21 |
| 4,801,191 A | 1/1989 | Nakai et al. ............. | 350/96.2 |
| 4,802,861 A | 2/1989 | Gaston ..................... | 439/247 |
| 4,829,407 A | 5/1989 | Bushell et al. ............ | 362/29 |
| 5,018,822 A | 5/1991 | Freismuth et al. ........ | 350/96.2 |
| 5,064,268 A | 11/1991 | Morency et al. .......... | 385/87 |
| 5,067,783 A * | 11/1991 | Lampert ................... | 385/60 |

(Continued)

OTHER PUBLICATIONS

International Search Report for PCT/US01/15792, dated Mar. 14, 2002.

(Continued)

*Primary Examiner*—Chandrika Prasad
(74) *Attorney, Agent, or Firm*—Patterson & Sheridan, L.L.P.

(57) ABSTRACT

A connector for joining a first fiber optic cable end and a second fiber optic end includes first and second connector ends adapted to receive the first and second fiber optic cable ends. Each connector end houses a plurality of termini for terminating the fiber optic cable ends. The connector also includes a first alignment feature and a second alignment feature. The first alignment feature includes a plurality of flanges formed on the first connector end to define a plurality of key openings and a plurality of key protrusions formed on the second connector end adapted to fit into the plurality of key openings to ensure proper alignment of the first and second connector ends. The second alignment includes a plurality of termini keys with each termini key being disposed on each of the termini and fitting into a key termini slot formed in the first and second connector ends for receiving the termini. The first and second alignment features ensure that the first connector end is properly aligned with respect to the second connector end and that each termini disposed in the first connector end is properly aligned with each termini disposed in the second connector end.

12 Claims, 9 Drawing Sheets

U.S. PATENT DOCUMENTS

| | | |
|---|---|---|
| 5,293,581 A | 3/1994 | DiMarco ............... 385/76 |
| 5,301,213 A | 4/1994 | Linden et al. ........... 376/260 |
| 5,384,885 A | 1/1995 | Diner .................. 385/140 |
| 5,433,275 A | 7/1995 | Melenyzer et al. ....... 166/380 |
| 5,590,229 A | 12/1996 | Goldman et al. .......... 385/59 |
| 5,925,879 A | 7/1999 | Hay .................. 250/227.14 |
| 5,928,034 A | 7/1999 | Tabata et al. ........... 439/595 |
| 5,997,362 A | 12/1999 | Hatagishi et al. ........ 439/701 |
| 6,234,683 B1 | 5/2001 | Waldron et al. ........... 385/78 |

OTHER PUBLICATIONS

Packard-Hughes Interconnect Fiber Optic Connectors, Fiber Optic Termini, MIL-T-29504, pp. 1-9.

* cited by examiner

FIBER OPTIC CABLE CONNECTOR WITH A PLURALITY OF ALIGNMENT FEATURES

CROSS-REFERENCE TO RELATED APPLICATIONS

This application is a continuation-in-part of U.S. patent application Ser. No. 09/594,645, filed Jun. 15, 2000 now U.S. Pat. No. 6,685,361, which is herein incorporated by reference.

BACKGROUND OF THE INVENTION

1. Field of the Invention

The present invention relates to connectors for fiber optic cables and, more particularly, to multi-channel connectors therefor that can be used in downhole applications and withstand high temperature and pressure.

2. Description of the Related Art

Fiber optic cables have been increasingly used for downhole oil and gas explorations. Specifically, the fiber optic cable is lowered into the well to transmit various information and data to the surface.

The fiber optic cable is typically housed in at least one protective tube to shield the fiber optic from the extremely harsh downhole environment. The fiber optic cable can be subjected to downhole ambient pressures of approximately one thousand (1,000) atmospheres and temperatures ranging from 0° C. to 175° C. (zero to one hundred seventy-five degrees Celsius). Additionally, the fiber optic cable is exposed to downhole corrosives such as water, sulfuric acid and others.

Besides harsh temperatures and pressures, there are a number of other requirements that must be taken into consideration for using fiber optic cable in the downhole applications. For example, packaging for fiber optic cable must be extremely compact for downhole use. Moreover, the fiber optic cable must come either in extremely long segments or be connected. For installation and assembly purposes, it is much easier to have smaller segments of fiber optic cable that connect to each other. However, the connectors for the fiber optic cable must ensure integrity of the transmitted data and information as well as withstand the harsh ambient conditions of the downhole environment.

Existing connectors are intended for the less harsh, surface environment and are typically either multi-channel or single channel. Commercially available multi-channel connectors use physical contact type pins or termini. One such termini is MIL-T-29504 which is manufactured by a number of vendors, one of which is Packard-Hughes Interconnect Corporation. However, these termini rely on the termini preload to cause the polished fiber surfaces to physically distort, thereby minimizing the glass-air interface as a strategy to improve the insertion and return loss performance of the termini. Unfortunately, prolonged exposure of the preloaded termini to temperatures in excess of the glass transition temperature of the epoxy used in bonding of the fiber to the termini will cause the fiber to push back, thereby compromising the geometric requirements for both return and insertion loss. Additionally, the connectors that would incorporate these termini do not meet temperature and pressure requirements for downhole use.

Certain single channel connectors are commercially available with angled termini to reduce the return loss of a physical contact connector. These connectors are manufactured with the end surface of the termini polished at an angle such that the Fresnel reflection at the glass-air interface of the termini is reflected at an angle that exceeds the numerical aperture of the fiber. This allows the return loss (reflected energy) of the connector to be reproducibly suppressed by more than one million times or 60 db. However, existing single-channel connectors are rated for temperatures ranging from −40° C. to 85° C., which is substantially inadequate for downhole use. Additionally, pressure rating of the single-channel angled physical contact connectors is not compatible for downhole use. Moreover, the diameter of the angled termini is at least 2.5 mm, which prohibits inclusion into multi-channel connectors that meet the dimensional requirements of the downhole environment.

Therefore, it is necessary to provide a connector for multi-channel use with fiber optic cable such that the connector can withstand the harsh temperatures and pressures of the well environment as well as have appropriate dimensions for downhole use.

SUMMARY OF THE INVENTION

It is an object of the present invention to provide a fiber optic cable connector for multi-channel use that can withstand the downhole harsh environment as well as satisfy dimensional requirements therefor.

According to the present invention, a connector for joining a first fiber optic cable end and a second fiber optic cable end includes first and second connector ends adapted to receive the first and second fiber optic cable ends with each connector end housing a plurality of termini for terminating the fiber optic cable ends, a first alignment feature for properly aligning the first connector end with respect to the second connector end, and a second alignment feature for properly aligning each termini disposed in the first connector end with each termini disposed in the second connector end. The first alignment feature includes a plurality of flanges formed on the first connector end to define a plurality of key openings and a plurality of key protrusions formed on the second connector end adapted to fit into the plurality of key openings to ensure proper alignment of the first and second connector ends. The second alignment feature includes a plurality of termini keys with each termini key being disposed on each of the termini and fitting into a keyed termini slot formed in the first and second connector ends for receiving the termini.

According to one feature of the present invention, each termini includes an angled tip surface for mating with a corresponding termini such that the angled tip surfaces of mating termini are properly aligned with respect to each other as a result of the second alignment feature.

According to another feature of the present invention, the first alignment feature of the present invention also provides protection for the termini.

The double alignment feature of the present invention allows the connector with multiple termini that require specific registration be properly aligned. The angled tip surface of the termini ensures improved connection between the fiber optic cable ends which in turn reduces unwanted reflections from the termini.

According to a further feature of the present invention, a back-shell weld feature includes a welding surface and a capillary opening for facilitating welding of a protective capillary tube shielding the fiber optic cable to the ends of the connector.

One major advantage of the present invention is that a multi-channel connector is sufficiently compact to be used for downhole applications. Another major advantage of the present invention is that the connector can withstand high temperatures and pressures.

The foregoing and other advantages of the present invention become more apparent in light of the following detailed description of the exemplary embodiments thereof, as illustrated in the accompanying drawings.

DETAILED DESCRIPTION OF THE PREFERRED EMBODIMENT

Figure 1:
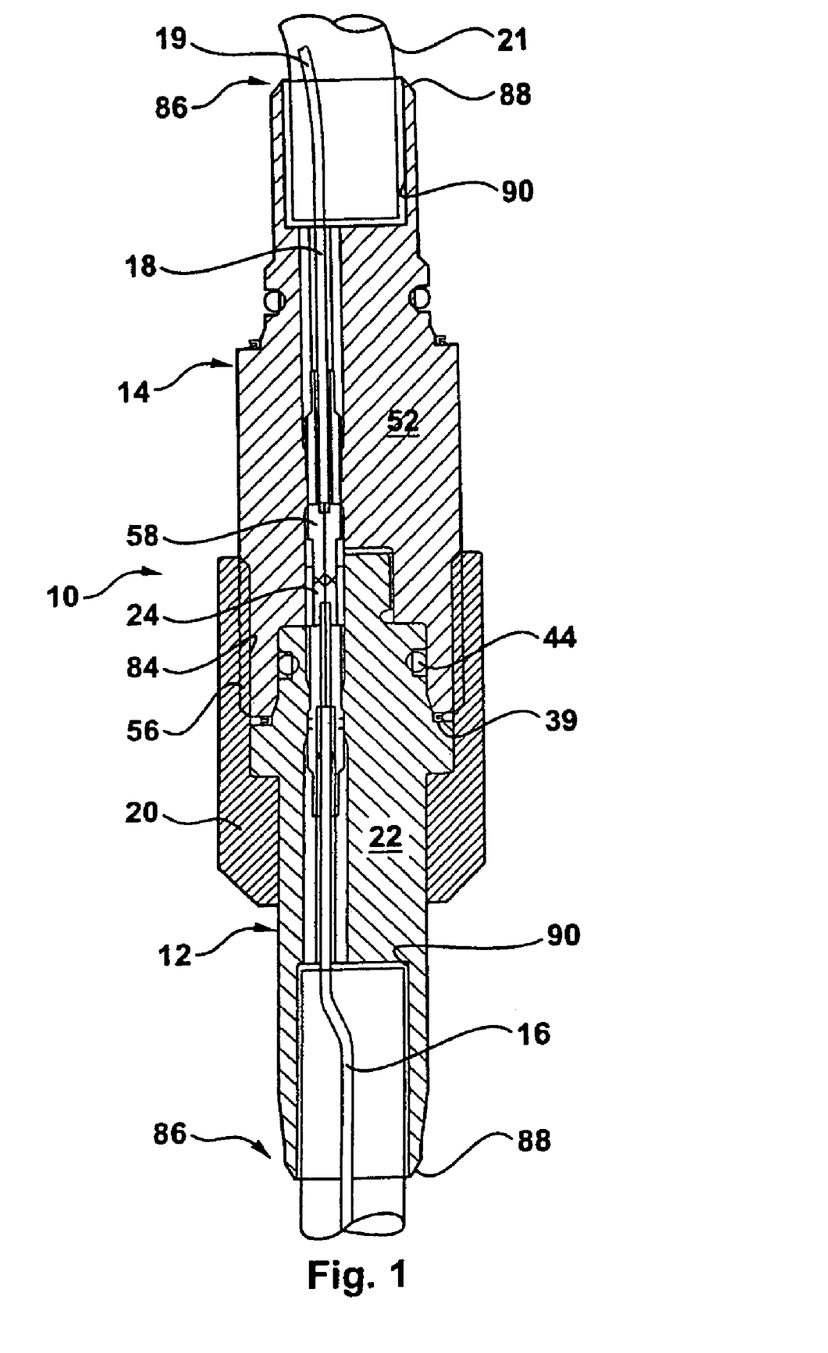
FIG. 1 is a cross-sectional view of a fiber optic connector.

Referring to FIG. 1, a fiber optic connector 10 has a male connector end 12 and a female connector end 14 for joining a first fiber optic cable end 16 and a second fiber optic cable end 18 of a fiber optic cable 19. The fiber optic connector 10 also includes a make-up nut 20. The fiber optic cable 19 is shielded by a capillary encapsulation tube 21.

Figure 2:
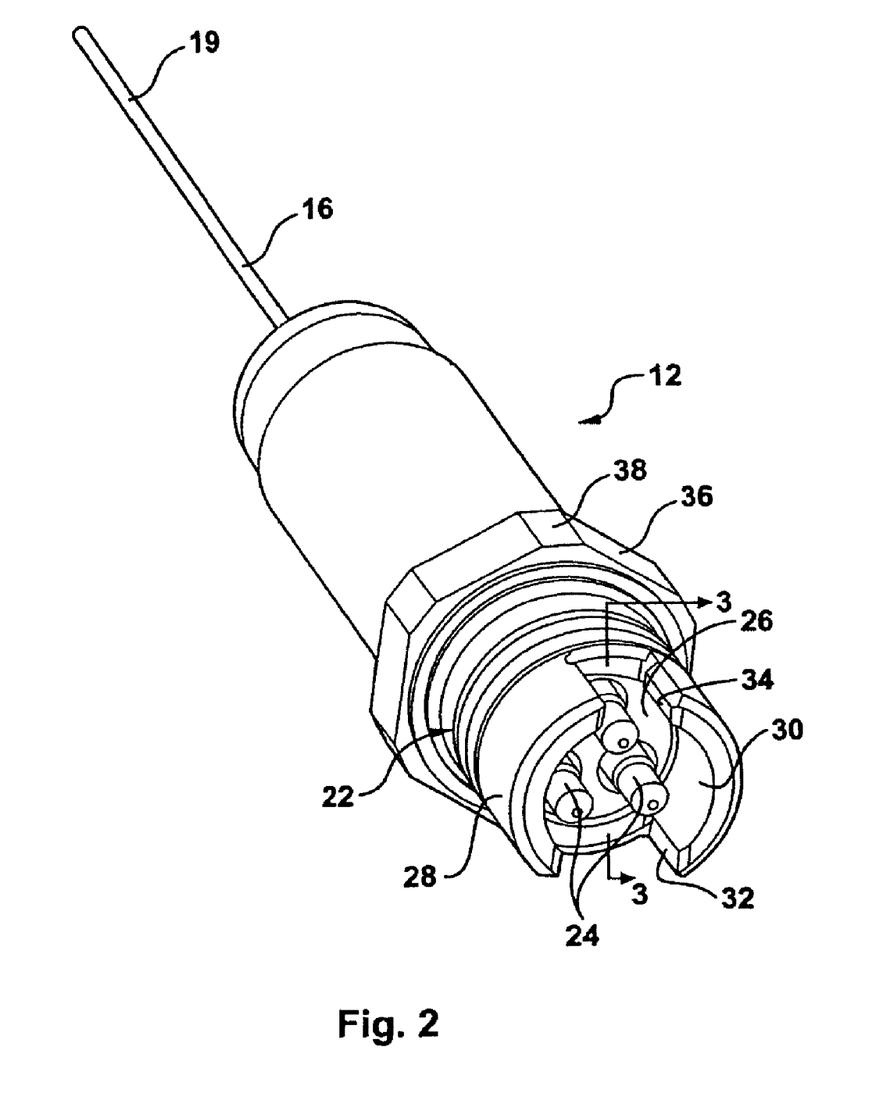
FIG. 2 is a perspective view of a male connector end of the fiber optic connector of FIG. 1.
Figure 3:
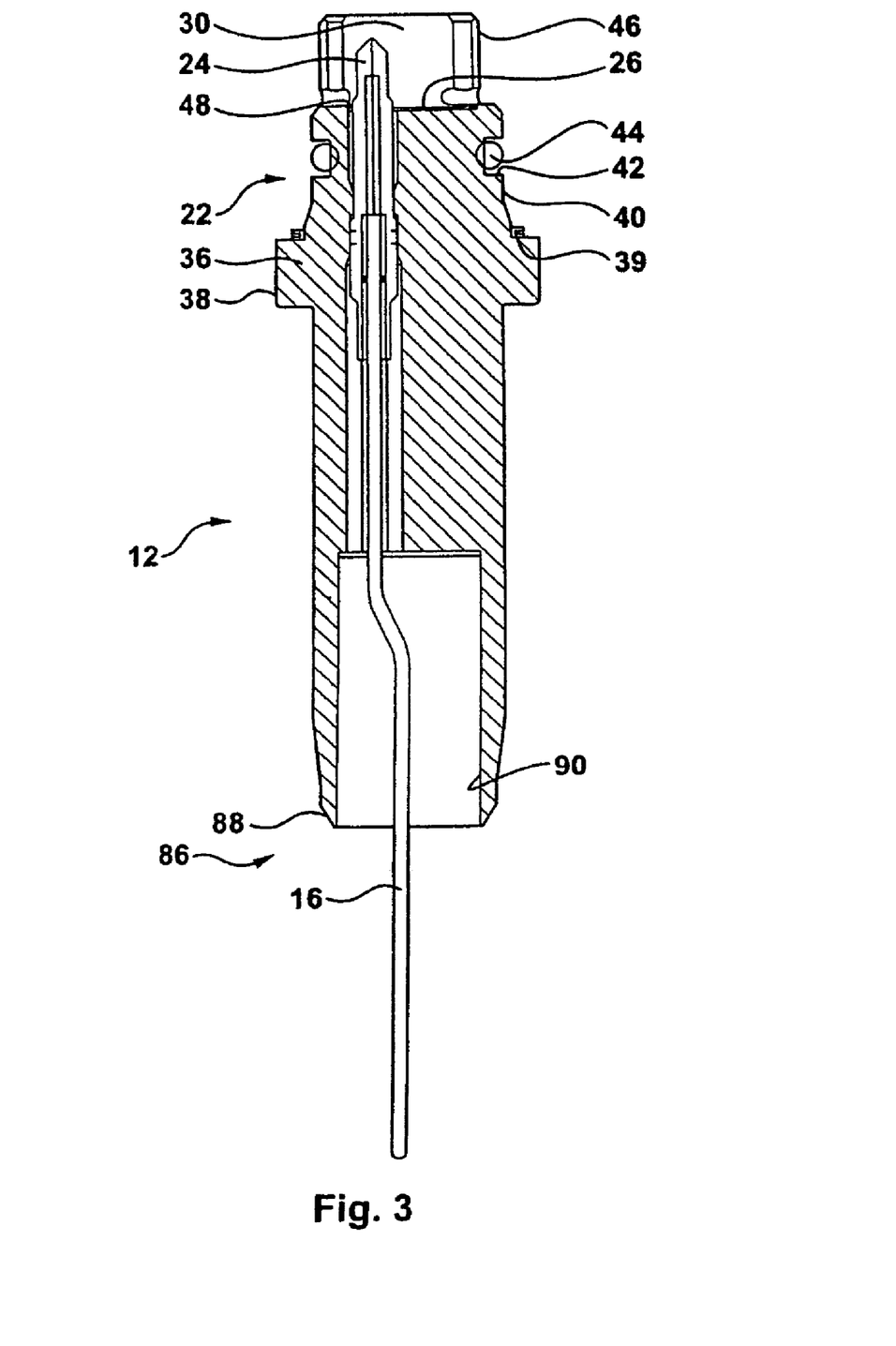
FIG. 3 is a cross-sectional view of the male connector end of FIG. 2 taken along line 3—3.
Figure 4:
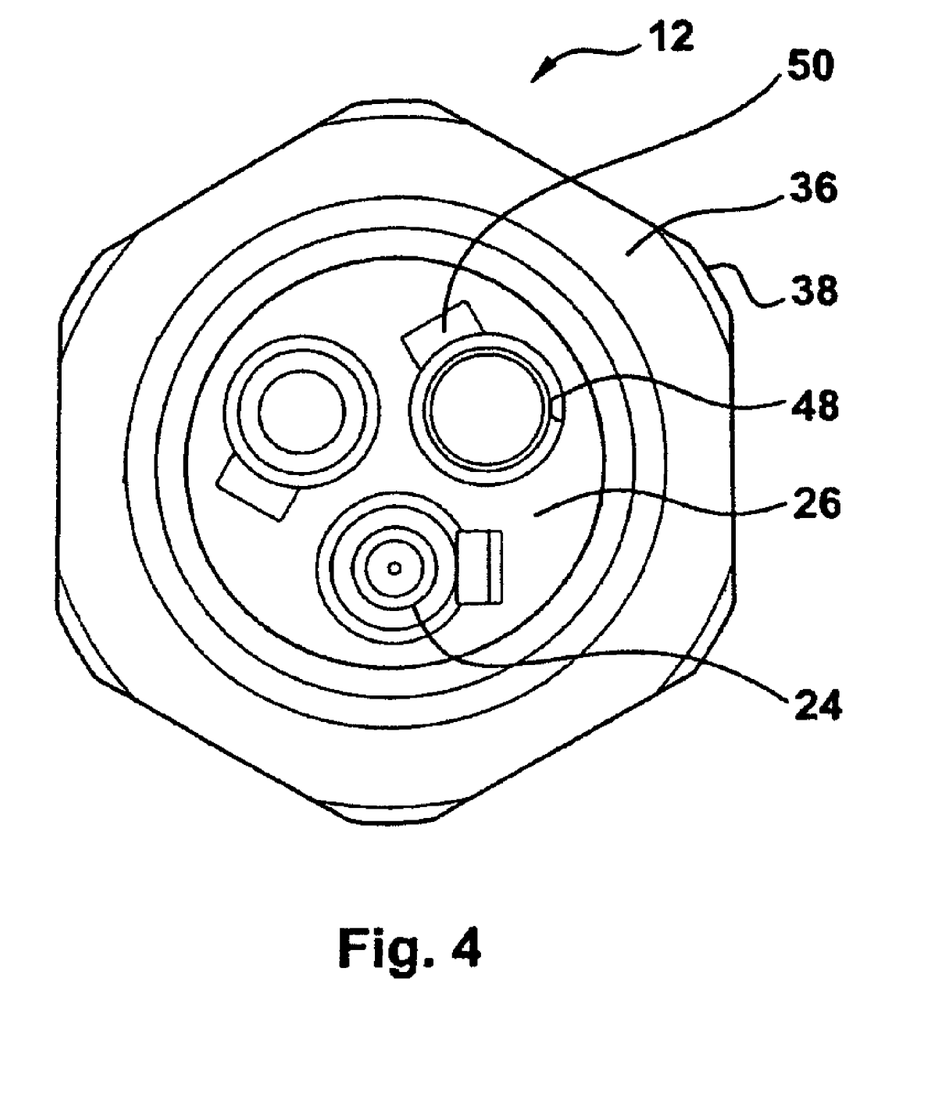
FIG. 4 is a rear view of the male connector end of FIG. 2.

Referring to FIGS. 2, 3 and 4, the male connector end 12 includes a male housing 22 for housing a plurality of male termini 24 protruding outward from a surface 26. A first flange 28 and a second flange 30 also protrude outwardly from the surface 26 protecting the plurality of termini 24 and forming a first key opening 32 and a second key opening 34. The male housing 22 includes a lip 36 having a lip outside diameter 38 for accommodating a metal seal 39. The male housing 22 also has a male housing outside diameter 40 and includes a groove 42 for receiving an elastomeric O-ring 44, as best seen in FIG. 3. The flanges 28, 30 have an outside flange diameter 46.

As best seen in FIG. 3, each termini 24 is inserted into a keyed termini receiver hole 48 formed within the first connector end 12. The keyed termini receiver hole 48 includes a keyed slot 50, as best seen in FIG. 4. Each termini 24 is used to terminate the fiber optic cable end 16.

Figure 5:
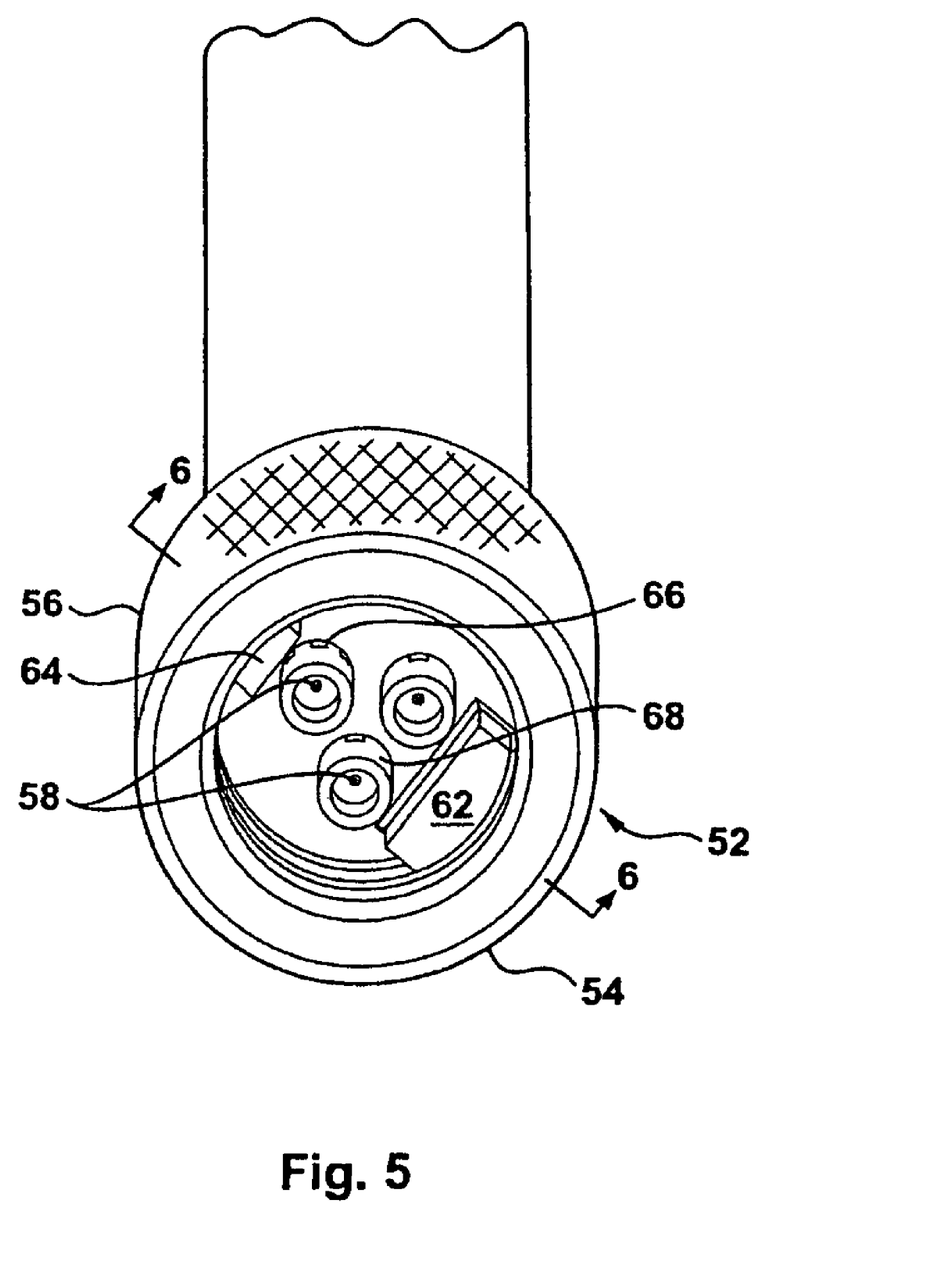
FIG. 5 is a perspective view of a female connector end of the fiber optic connector of FIG. 1.
Figure 6:
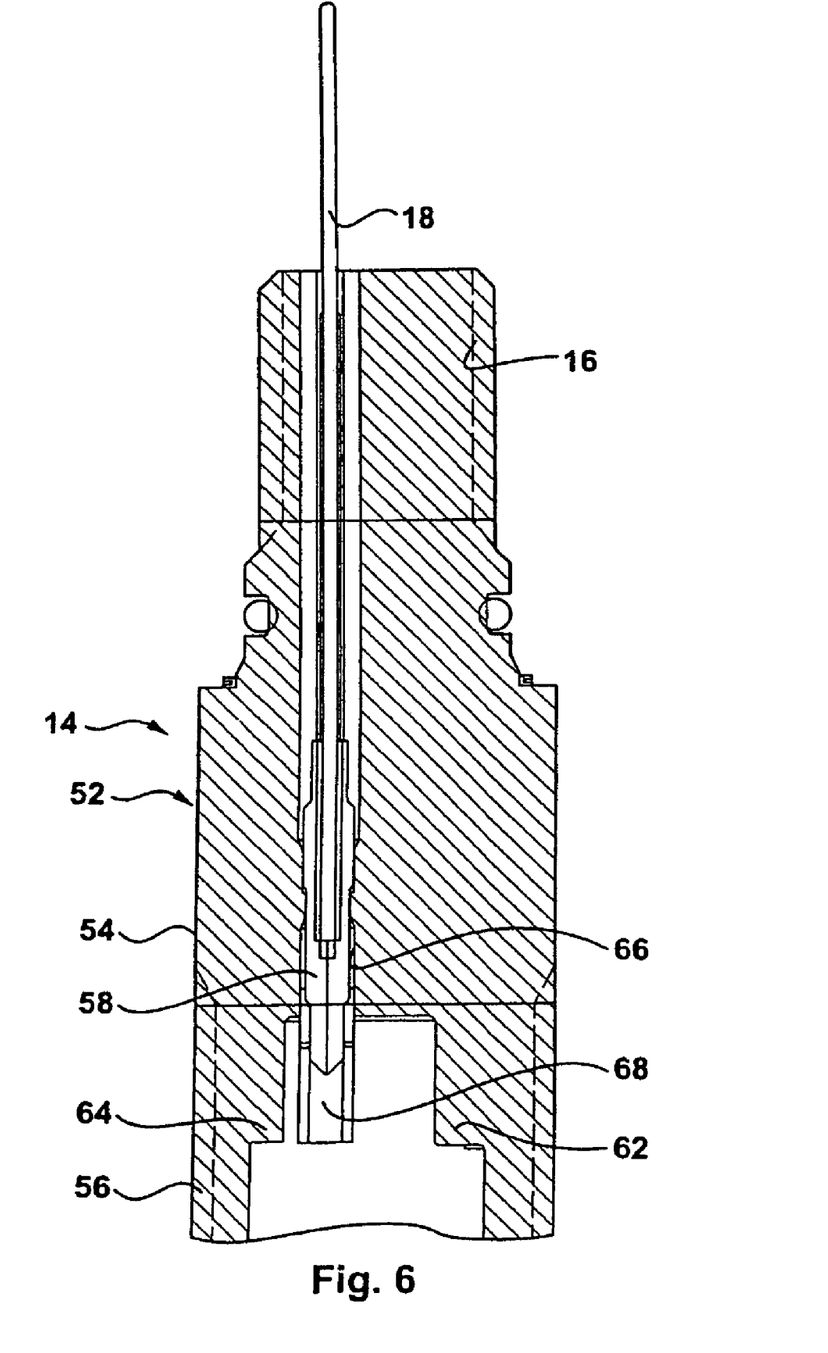
FIG. 6 is a cross-sectional view of the female connector end of FIG. 5 taken along line 6—6.
Figure 7:
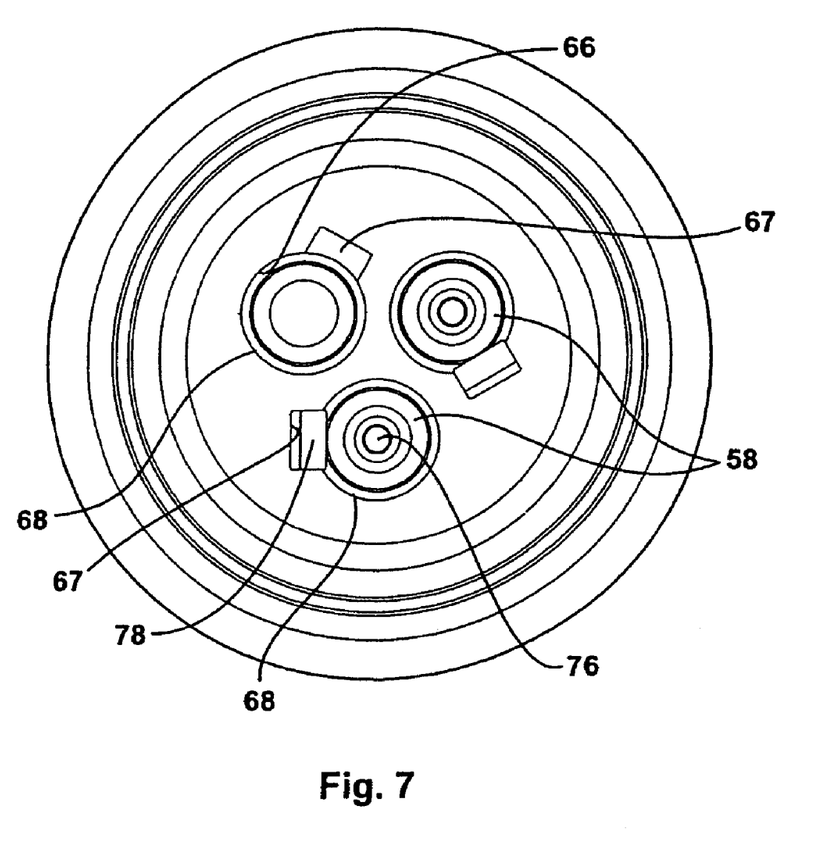
FIG. 7 is a rear view of the female connector end of FIG. 5.

Referring to FIGS. 5, 6, and 7, the female connector end 14 includes a female housing 52 having an outside surface 54 and a plurality of threads 56. A plurality of female termini 58 are disposed within the female housing 52. The housing 52 includes an inside diameter 60 sized to accept the outside diameter 40 of the male housing 22. The female housing 52 also includes a first key protrusion 62 and a second key protrusion 64 adapted to be received within the first key opening 32 and the second key opening 34, respectively. The first key opening 32 and first key protrusion 62 are sized differently from the second key opening 34 and the second key protrusion 64 to ensure proper alignment between the male and female connector ends 12, 14 and, in combination, form a first alignment feature of the fiber optic connector 10. The key protrusions 62, 64 are of sufficient length to prevent engagement of the termini until proper angular alignment between the ends 12, 14 is achieved. The female housing 52 also includes a plurality of keyed termini holes 66 for accepting the plurality of female termini 58. Each termini hole 66 also includes a keyed slot 67 and has a sleeve 68 extending past the outward end of the termini 58.

Figure 8:
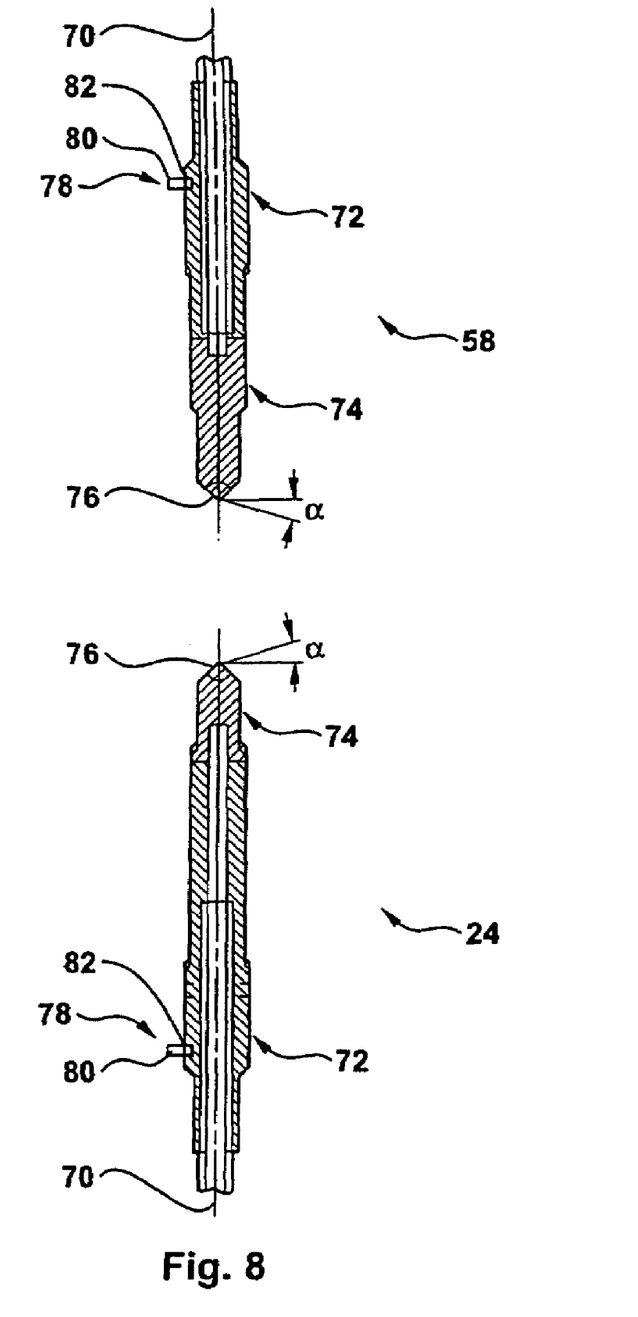
FIG. 8 is a cross-sectional, exploded view of a first termini and a second termini for use in the fiber optic cable connector of FIG. 1.

Referring to FIG. 8, each termini 24, 58 has a central axis 70 and includes a base part 72 and a top part 74 with the top part 74 terminating with a tip surface 76. Each base part 72 of each termini 24, 58 includes a termini key 78. In the preferred embodiment of the present invention, the termini key 78 is a pin 80 inserted in an opening 82 formed within the base part 72 and protruding outwardly therefrom. The tip surface 76 of each termini 24, 58 is angled and forms an angle α with a line perpendicular to the axis 70 of the termini 24, 58. In the preferred embodiment of the present invention, the angle α is approximately eight degrees (8°). The angled tip surface 76 at each termini 24 is formed to mate with the corresponding termini 58 when both termini 24, 58 are properly keyed into respective connector ends 12, 14. For higher numerical aperture fiber the angle α can be increased to approximately fifteen degrees (15°).

Referring to FIGS. 4 and 7, each termini 24, 58 is inserted into the termini keyed hole 48, 66, respectively. Each termini key 78 fits into the corresponding keyed slot 50, 67 of the termini keyed hole 48, 66. The keyed termini slot 50, 67 and the termini key 78 of each termini 24, 58 define a second alignment feature of the fiber optic connector 10 which ensures that the male termini 24 is properly aligned with the female termini 58 for each particular termini connection.

Referring to FIG. 1, the make-up nut 20 is adapted to fit over the male connector end 12 and includes threads 84 on the inside thereof to mate with the threads 56 of the female connector end 14. In the preferred embodiment of the present invention, the nut 20 is fabricated from beryllium copper (BeCu) and, when torqued to specifications, provides sufficient elasticity to prevent back-off.

Referring to FIGS. 1 and 3, the male and female housings 22, 52 also include a back-shell weld feature 86 that incorporates a welding surface 88 and a capillary opening 90 adapted to receive ends of the capillary encapsulation tube 21. Alternatively, the female housing 52 can include threads 91 for receiving threaded tube or other equipment that cannot be welded, as best seen in FIG. 6.

In operation, the connector ends 12, 14 are welded to the encapsulation tube 21 shielding the fiber optic cable 19. The ends of the capillary tube 21 are placed into the capillary opening 90 and welded at the welding surface 88 to attach the connector ends 12, 14 to the capillary tube 21. As the two ends 12, 14 of the connector 10 are joined, the first alignment feature 32, 34, 62, 64 ensures that the two connector ends 12, 14 are properly aligned with respect to each other. Thus, the connector ends 12, 14 are rotated with respect to each other until the first key protrusion 62 and the second key protrusion 64 fit into the first key opening 32 and the second key opening 34, respectively. Once the connector ends 12, 14 are properly aligned with respect to each other, the plurality of male termini 24 fit into the plurality of sleeves 68 and slide to make connection with the female termini 58, as best seen in FIG. 1. The second alignment feature 50, 67, 78 ensures that each termini connection is properly made. Thus, the angled tip surface 76 of each female termini 58 registers with the angled tip surface 76 of the male termini 24, as both termini keys of termini 24, 58 are keyed into their respective slots 50, 67. The angled tip surface 76 of the termini 24, 58 ensures that retro-reflection is minimized. Once the termini connections are made, the make-up nut 20 is secured onto the female portion 14 of the connector 10 by having the threads 56, 84 mate. The metal seal 39, sandwiched between the male and female connector ends 12, 14, provides a primary level of seal protection. The O-ring seal 44 provides a secondary or back-up seal, should the metal seal 39 fail.

In the preferred embodiment of the present invention, the termini 24, 58 are a single channel termini, MIL-T-29504 equivalent, purchased from Packard-Hughes Interconnect Company that have a diameter of approximately two millimeters (2 mm) and have been further modified to include an approximately eight degree (8°) angle on the tip surface 76 thereof and to include the key 78 on the base part 72 thereof.

Figure 9A:
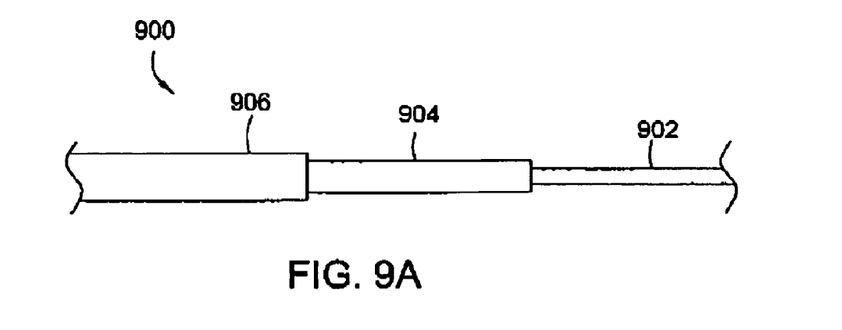
FIGS. 9A–B illustrate an exemplary prepared fiber end assembly and an exemplary terminated fiber assembly (TFA), respectively, for use in the fiber optic cable connector of FIG. 1.

For some embodiments, the termini 24 and 58 may be prepared as part of a terminated fiber assembly (TFA), which may be pre-assembled and subsequently inserted into the ends 12 and 14, respectively, of the connector 10. Such a TFA may be assembled starting with a prepared fiber end assembly 900, such as that shown in FIG. 9A, having a length of bare fiber 904 exposed via removal of protective (e.g., teflon) coating 906. A protective tubing 904 (e.g., polyamide) may be threaded onto the bare fiber 904.

Figure 9B:
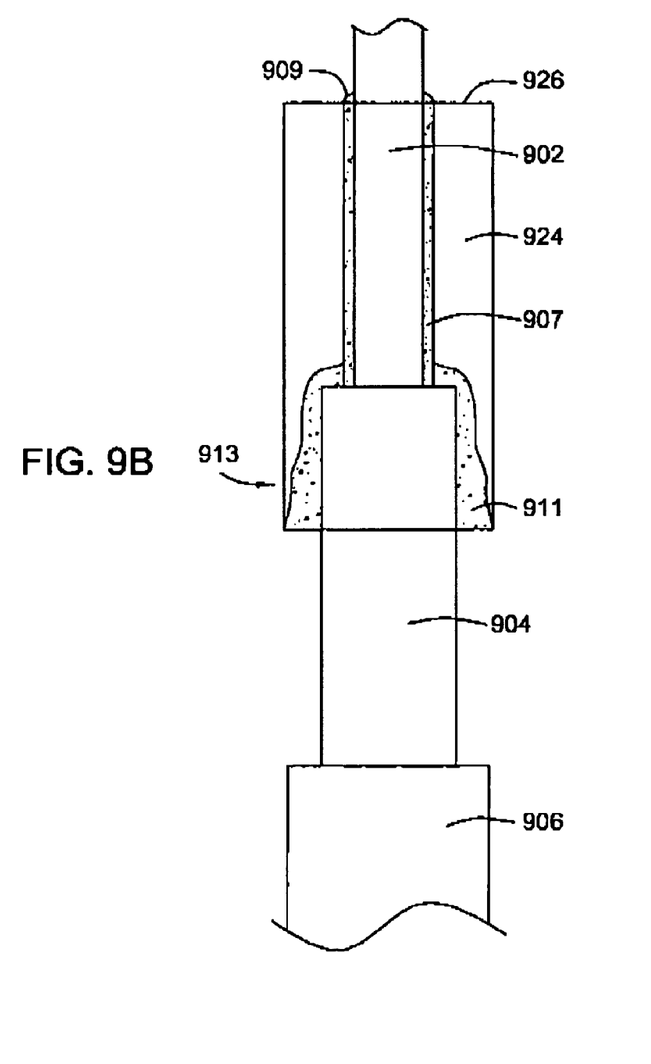

As illustrated in FIG. 9B, the fiber end assembly 900 may be inserted into a back shell 913 of a terminus 924, for example, until the protective tubing 904 contacts an inner wall 911 of the back shell 913 and a portion of the bare fiber 902 extends from an end of the terminus 924. Accordingly, the length of the bare fiber 902 and tubing 904 may depend on the dimensions of the terminus 924.

Prior to insertion, epoxy 907 (or other suitable adhesive) may be deposited into the back shell 913, for example, via a syringe or other type epoxy dispenser, to hold the bare fiber 902 in the terminus 924. A bead of epoxy 911, or other suitable type material, may be deposited at the rear of the back shell 913 to act as a strain relief. The epoxy may then be cured, for example, by heating the terminus assembly in some type of heating chamber, taking care to protect the bare fiber 902 from direct contact with a heating surface.

After the epoxy has cured and the terminus assembly has cooled, the bare fiber 902 may be cleaved (e.g., just above a bead of epoxy 909 formed at an end of the terminus 924) using any suitable cleaving means, such as a hand-held cleave tool. For some embodiments, the cleaved bare fiber 902 and terminus end 926 may be air polished (e.g., using a 12 u Al-Oxide Foam backed paper in small circular motion) until the epoxy bead 909 feels smooth to the touch.

The terminus end 926 may then be further polished by inserting the terminus assembly into a polishing puck and polishing the terminus end 926 on a polishing film deposited on a glass plate, for example, using a number of patterned motions (e.g., FIG. 8 turns) designed to ensure even polishing. In any of the aforementioned polishing operations, a light film of water may be initially sprayed onto the polishing film.

The terminus assembly may then be removed from the puck and inserted into an apparatus (e.g., another type of polishing puck) for forming an angled tip surface (e.g., similar to the angled tip surfaces 76 shown in FIG. 8). The terminus assembly may be clamped into the assembly and polished with a polishing machine using a suitable durometer pad (e.g., according to the material of the terminus 924) to ensure precise control of the polishing. The end 926 of the assembly may then be polished (or machined) with suitable pressure and duration to form the angled tip surface having the desired angle (e.g., 8° as previously described).

After the angled tip surface is formed, the light carrying properties of the terminus assembly may be tested using any suitable tests, such as white light interferometer inspection. The terminus assembly may be placed into a test fixture with white light transmitted therethrough, while comparing measured parameters to a set of expected parameters. Results of the test may be saved to file or printed and saved as quality documentation for the terminus assembly (or a batch of such assemblies).

Additional measurements, such as insertion and return loss measurements may also be taken, for example, using pin and socket termini-pairs inserted into a test fixture. The termini pairs may be inserted into the test fixture and aligned, with a proper radial force applied to bring the termini tips into physical contact. Insertion loss and/or return loss may then be measured using any suitable techniques, such as transmitting light of a known power from one end of the termini junction and detecting the power of the light received at the other end and/or detecting the power of light reflected back through the termini junction (e.g., reflected from Bragg gratings).

Any other type tests, such as temperature cycle tests may also be performed on the terminus assemblies. For example, termini pairs may be inserted into a connector or test housing and mated while subjecting the mated termini to a known temperature (e.g., 175°) for a predefined period of time (e.g., 6 hours minimum). The termini may then be re-inspected by taking any of the previously described measurements (e.g., white light interferometer, insertion and/or return loss).

While the terminated fiber assembly (TFA) of FIG. 9B is assembled by securing the fiber end assembly 900 to the terminus 924 via epoxy 907, for other embodiments, a terminus structure may be collapsed onto the fiber end assembly 900, thus eliminating or reducing the need for epoxy. One technique for collapsing a terminus structure onto a prepared fiber end assembly is described in the commonly assigned application Ser. No. 10/755,722 entitled "Low-Loss Large-Diameter Pigtail" filed Jan. 12, 2004, herein incorporated by reference in its entirety.

In any case, terminated fiber assemblies (TFAs) may be pre-assembled, tested, and later used to produce a final connector 10. By utilizing pre-assembled TFAs, a variety of different type TFAs may be produced and stocked, thus allowing for a modular connector design, in which the specific TFAs may be chosen, for example, according to a particular application. Utilizing pre-assembled TFAs may also facilitate field repair and replacement.

One major advantage of the present invention is that the fiber optic connector 10 has two alignment features that allow multiple termini connections be made while ensuring proper alignment of each of these termini connections. Another major advantage of the present invention is that this multi-channel connector can be used in downhole applications. The connector 10 of the present invention can operate for temperatures ranging approximately from 0° C. to 175° C. (zero to one hundred seventy-five degrees Celsius) and ambient pressures of approximately one thousand (1,000) atmospheres.

A further advantage of the present invention is that the back-shell weld feature 86 not only facilitates attachment of the connector ends 12, 14 onto the capillary tube, but also acts as both the strength element anchor for the fiber optic cable as well as the environment seal to prevent flooding of the cable.

A number of features of the present invention contribute and ensure that this connector can be used in extremely harsh environment. One such feature is the choice of high strength, corrosion resistant alloys such as Inconel 718 and beryllium copper (BeCu). Another such feature is the thickness and material from which the nut 20 is manufactured. The elasticity of the make-up nut eliminates the need for safety wire or anti-rotation pawls.

While the present invention has been illustrated and described with respect to a particular embodiment thereof, it should be appreciated by those of ordinary skill in the art, that various modifications to this invention may be made without departing from the spirit and scope of the present invention.

The invention claimed is:

1. A connector for joining a first fiber optic cable end and a second fiber optic end of a fiber optic cable, said connector comprising:
    a first connector end adapted to receive said first fiber optic cable end;
    a second connector end adapted to receive said second fiber optic cable end;
    a first plurality of termini disposed within said first connector end for terminating said first fiber optic cable end, wherein the first plurality of termini is unbiasly fixed within the first connector;
    a second plurality of termini disposed within said second connector end for terminating said second fiber optic cable end, each termini of said first plurality of termini mating with each respective termini of said second plurality of termini;
    a first alignment feature for properly aligning said first connector end with respect to said second connector end; and
    a second alignment feature for properly rotationally aligning each termini of said first plurality of termini with each termini of said second plurality of termini.

2. The connector according to claim 1 further comprising a nut disposed about said first connector end and being threadably attached to said second connector end.

3. The connector according to claim 1 wherein said first alignment feature comprises:
    a plurality of flanges formed on said first connector end to define a plurality of key openings; and
    a plurality of key protrusions formed on said second connector end adapted to fit into said plurality of key openings to ensure proper alignment of said first and second connector ends.

4. The connector according to claim 3 wherein said plurality of key openings include a first key opening and a second key opening with said first and second key openings having different sizes and wherein said plurality of key protrusions having a first key protrusion and a second key protrusion corresponding in size to said first and second key openings, respectively.

5. The connector according to claim 1 wherein said second alignment feature comprises a plurality of termini keys with each termini key being disposed on each of said plurality of termini, each said termini key fitting into a termini keyed hole formed in said first and second connector ends for receiving said termini.

6. The connector according to claim 5 wherein said termini key is a pin inserted into a base part of each of said termini, said pin fitting into a keyed slot of said termini keyed hole.

7. The connector according to claim 1 wherein said termini includes an angled tip surface for mating with a corresponding termini, said angled tip surface being properly aligned with respect to each other when joined as a result of said second alignment feature.

8. The connector according to claim 1 wherein said connector is multi-channeled.

9. The connector according to claim 1 wherein said connector is rated to withstand temperatures ranging from approximately 0° C. to approximately 175° C.

10. The connector according to claim 1 wherein said connector is rated to withstand ambient pressures of approximately one thousand (1,000) atmospheres.

11. The connector according to claim 1 wherein said connector further comprises a back-shell welding feature to facilitate welding of each of said connector ends to protective tubing of said fiber optic cable.

12. The connector according to claim 11 wherein said back-shell welding feature comprises:
    a welding opening formed within said connector end adapted to receive said protective tubing; and
    a welding surface formed on one end of said connector end substantially adjacent said welding opening.

* * * * *